June 10, 1924.

A. S. HYDE 1,497,295

DEMOUNTABLE RIM FOR VEHICLE WHEELS

Filed June 21, 1920

INVENTOR
ARTHUR S. HYDE
BY
ATTORNEY

Patented June 10, 1924.

1,497,295

UNITED STATES PATENT OFFICE.

ARTHUR S. HYDE, OF HARTFORD, CONNECTICUT, ASSIGNOR TO BAUSH MACHINE TOOL COMPANY, A CORPORATION OF MASSACHUSETTS.

DEMOUNTABLE RIM FOR VEHICLE WHEELS.

Application filed June 21, 1920. Serial No. 390,405.

*To all whom it may concern:*

Be it known that I, ARTHUR S. HYDE, a citizen of the United States, resident of Hartford, Connecticut, and whose post-office address is care Baush Machine Tool Company, Springfield, Massachusetts, have invented certain new and useful Improvements in Demountable Rims for Vehicle Wheels, of which the following is a specification.

My invention aims to provide a demountable rim having certain advantages in lightness, strength, durability and ease of accurate manufacture, and adapted to carry an inflated pneumatic tire and to be readily detached from the wheel without disturbing the tire; the principal improvements being in the material and method of manufacture whereby a rim is produced having a new combination of advantageous qualities.

For many years aluminum and alloys thereof have been used to a greater or less extent, but no such alloy has been thought to be adapted for use in the making of wheel rims, having the necessary physical qualities to make a rim which should be strong and durable against the strains and blows which are received in use and having a high resistance to corrosion, and which could be readily cast and forged and machined to the accuracy required for a good fit which would facilitate the mounting and demounting of it.

I have found that there are certain alloys of aluminum which by an appropriate method of manufacture and treatment can be made into demountable rims which will have the qualities desired, with greater durability and much greater lightness than steel and at a reasonable cost. These qualities make such a rim greatly desired for automobiles. Tires of the size now generally used are in themselves quite heavy and the added weight of a steel rim makes the mounting and demounting of them a matter of considerable difficulty for any one except a comparatively strong person. The rims of my invention will reduce the weight of metal to approximately one-third that of a steel rim so as to practically remove this objection. At the same time such rims are hammered and treated very roughly in practice and must have sufficient strength to sustain such treatment as well as the strains of use, and I have found that these qualities are obtainable with the alloys of aluminum here referred to. A specific example of the composition and the method of manufacture which I prefer is the following.

An aluminum alloy is used consisting of aluminum 94%, magnesium 0.5% and the balance chromium, manganese and copper in varying proportions. The chromium is less important than the other ingredients but is useful in producing a good polished wearing surface, which it is important to have on the inner face of the rim so that it may slide freely on and off the wheel. The alloy is cast into ingots, worked as by rolling or forging into billets and then cut and forged, preferably drop forged, into blanks in the form of a ring. Or the alloy may be cast in rings and forged to dimensions. Such forging or otherwise working of the metal increases its tensile strength, as for example, from 27,000 pounds per square inch to 37,000 or as high as 40,000 pounds.

The forged rings are then heated to a temperature approximating 500 to 525 degrees centigrade and quenched. It is found that this heat treatment increases the physical qualities very substantially. For example, an alloy having beforehand an ultimate tensile strength of 36,000 pounds per square inch will have its strength increased to 55,000 or 60,000 pounds. The elastic limit will be raised from 25,000 pounds per square inch to 36,000, the elongation from 2 to 20% and the reduction under strain from 6 to 40%. There is thus produced a metal having approximately the strength of steel, with a comparatively frictionless quality which is highly desirable in demountable rims, and of a weight very much less, about one-third as great in fact.

The heat treatment is not completely effective at once. It requires an aging of the metal for a period of one to five days in order to bring it to the desired physical characteristics. The aging of the metal after the heat treatment serves also to bring it to a condition in which it machines or cuts better than before. The machining can be done before the aging is complete but it can be done better afterwards. Or the forging or pressing operations may be sufficiently accurate to avoid the necessity of any machining. And instead of working from a ring shaped blank a straight rolled blank may be used and bent into circular shape. The finished demountable rim will be of any usual or suitable shape and split so that it may by springing one end inward be fitted to the tire.

There are considerable variations possible in the composition of the aluminum alloy and in the proportions of the components. The important thing is to use such an alloy as will be capable of transformation by heat treatment and working or forging into a metal of comparatively high strength and elastic limit, though it consists chiefly of aluminum and weighs little more than aluminum.

The aluminum alloys above referred to and the heat treatment thereof have been known for a number of years, examples of the same being described in Wilm Patents No. 1,130,785 filed in 1911 and 1,261,987 filed in 1912. They have not been used however for wheel rims or the like although throughout this period numerous developments in such rims have taken place and efforts have been made to lighten and improve such rims. I have discovered that rims made of this aluminum alloy have not only the known qualities of lightness and strength but also a quite unexpected resistance to abrasion and shock and have a smoothness or lack of friction which makes it much easier to apply and demount them.

The best results have been obtained with an extensive working of the alloy in making the billet or the blank, and the alloy referred to lends itself excellently to such operations. For example, in the making of the rims referred to I have rolled and forged the metal down to one-third or one-fourth its original cross-section. This has produced a dense, tough, fibrous structure excellently adapted for use in demountable rims.

The reduction of weight effected by my improved rims is of very considerable importance in the reduction of the load to be carried by the motor. But it is particularly important in that it brings the weight of the modern demountable rim and tire down from a point where they are almost too heavy to be handled by one unaccustomed to manual labor to a point where they can be easily handled by such persons.

The accompanying drawings illustrate embodiments of the invention.

Figure 1:
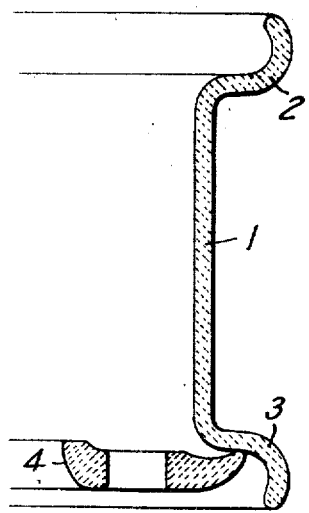
Fig. 1 is a radial section of a rim with a lamping ring adjacent thereto.
Figure 2:
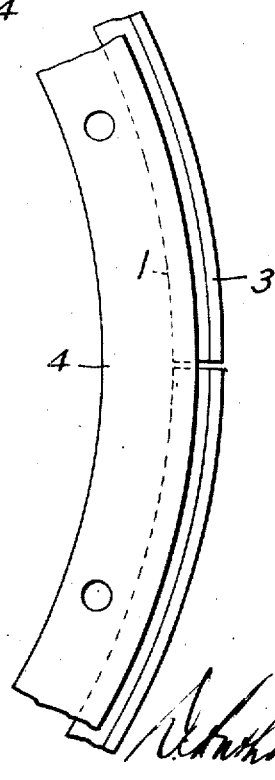
Fig. 2 is a face elevation of the same.

Figs. 1 and 2 show the rim with a flat central portion 1 and flanges 2 and 3 made in one piece of the aluminum alloy described. The clamping ring 4 shown in juxtaposition with the demountable rim and of a common design, may also be made of the same alloy and by the same method of manufacture. Or the ordinary steel ring may be used for this purpose since its weight is comparatively slight and it is handled separately from the demountable rim. In the matter of handling, it is so small that the material of which it is made is not important; though in the matter of reducing the total weight of the vehicle its manufacture of the aluminum alloy constitutes a substantial contribution.

Figure 3:
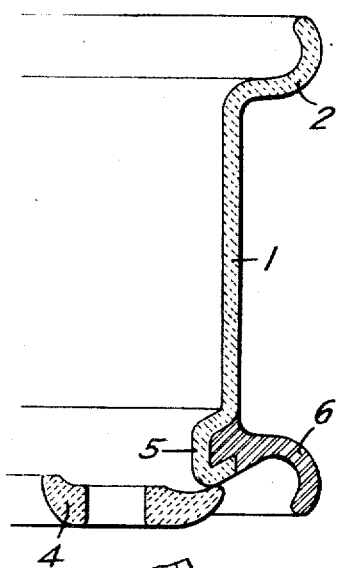
Figs. 3 and 4 are similar sections of modified designs.

According to Fig. 3 the flat portion 1 of the rim is formed with one integral flange 2. Its opposite edge however is formed with a groove 5, and a flange 6 is cast in engagement with said groove so as to be locked in place. The flange 6 is of steel for economy's sake.

Figure 4:
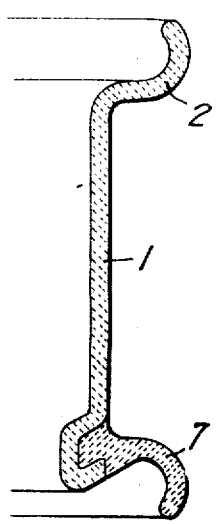

I prefer, however, to use the construction of Fig. 4 which is the same as that of Fig. 3 except that the separate flange 7 is made also of the aluminum alloy.

Though I have described with great particularity of detail certain specific embodiments of my invention, yet it is not to be understood therefrom that the invention is restricted to the exact designs, composition and methods described. Various modifications in these respects may be made by those skilled in the art without departing from the invention as defined in the following claims.

What I claim is:

1. A demountable rim for automobile wheels made of an aluminum alloy of the class described consisting mainly of aluminum which has been worked and heat treated to increase its density, tensile strength and elastic limit.

2. A demountable rim for automobile wheels in combination with a ring for fastening the same on a wheel, both said parts being made of an aluminum alloy of the class described consisting mainly of aluminum which has been worked and heat treated to increase its density, tensile strength and elastic limit.

In witness whereof, I have hereunto signed my name.

ARTHUR S. HYDE.